(12) United States Patent
Mohebbi

(10) Patent No.: US 6,836,661 B2
(45) Date of Patent: Dec. 28, 2004

(54) SOFT HAND-OFF IN CELLULAR MOBILE COMMUNICATIONS NETWORKS

(75) Inventor: Behzad Mohebbi, San Diego, CA (US)

(73) Assignee: Fujitsu Limited, Kawasaki (JP)

( * ) Notice: Subject to any disclaimer, the term of this patent is extended or adjusted under 35 U.S.C. 154(b) by 381 days.

(21) Appl. No.: 10/043,408

(22) Filed: Jan. 11, 2002

(65) Prior Publication Data
US 2002/0058481 A1 May 16, 2002

Related U.S. Application Data

(62) Division of application No. 09/696,574, filed on Oct. 25, 2000, now Pat. No. 6,603,971, which is a continuation of application No. PCT/GB99/01347, filed on Apr. 28, 1999.

(30) Foreign Application Priority Data

May 14, 1998 (GB) .............................................. 9810424

(51) Int. Cl.[7] .............................................. H04Q 7/20
(52) U.S. Cl. ................ 455/437; 455/436; 455/439; 455/440; 455/441; 455/442; 455/447; 370/331; 370/332; 370/347
(58) Field of Search ........................ 455/67.11, 115.3, 455/524, 525, 436, 437, 439, 442; 370/331, 332, 347

(56) References Cited

U.S. PATENT DOCUMENTS

| | | | |
|---|---|---|---|
| 5,309,503 A | | 5/1994 | Bruckert et al. |
| 5,345,467 A | * | 9/1994 | Lomp et al. ................. 370/331 |
| 5,432,843 A | | 7/1995 | Bonta |
| 5,483,668 A | * | 1/1996 | Malkamaki et al. ......... 455/442 |
| 5,517,674 A | | 5/1996 | Rune |
| 5,666,656 A | * | 9/1997 | Rautiola ..................... 455/513 |
| 5,701,585 A | | 12/1997 | Kallin et al. |
| 5,913,169 A | | 6/1999 | Vaara |
| 5,920,817 A | * | 7/1999 | Umeda et al. ............... 455/437 |
| 6,009,327 A | * | 12/1999 | Park ............................ 455/439 |
| 6,078,570 A | * | 6/2000 | Czaja et al. ................. 370/331 |
| 6,085,088 A | * | 7/2000 | Mishina ....................... 455/436 |
| 6,108,322 A | | 8/2000 | Kotzin et al. |
| 6,111,864 A | * | 8/2000 | Kabasawa ................... 370/332 |
| 6,122,265 A | | 9/2000 | Nakamura et al. |
| 6,141,555 A | | 10/2000 | Sato |
| 6,208,860 B1 | * | 3/2001 | Kim et al. ................... 455/440 |

FOREIGN PATENT DOCUMENTS

| | | |
|---|---|---|
| EP | 0 577 322 | 1/1994 |
| EP | 0 645 940 | 3/1995 |
| EP | 0 797367 A2 | 9/1997 |
| GB | 2 012 525 | 7/1979 |
| GB | 2 242 337 | 9/1991 |
| GB | 2 337 414 | 11/1999 |
| JP | 6-45978 | 2/1994 |
| JP | 6-188820 | 7/1994 |
| JP | 7-274232 | 10/1995 |
| JP | 7-298335 | 11/1995 |
| JP | 7-298336 | 11/1995 |

(List continued on next page.)

Primary Examiner—Marceau Milord
(74) Attorney, Agent, or Firm—Katten Muchin Zavis Rosenman

(57) ABSTRACT

In a cellular mobile communications network a mobile station is capable of receiving a downlink signal from each of a plurality of base stations and transmitting an uplink signal to the plurality of the base stations through a wireless channel. The mobile station produces a measure of signal quality of the downlink signals from the plurality of base stations to the mobile station and selects a base station from which the downlink signal shows a preferred signal quality. The mobile station transmits an uplink signal indicating the selected base station among the plurality of base stations for subsequent communications with the mobile station. Each base station processes the uplink signal to identify the selected base station from among the plurality of base stations.

7 Claims, 8 Drawing Sheets

FOREIGN PATENT DOCUMENTS

| | | |
|---|---|---|
| JP | 8-505028 | 5/1996 |
| JP | 8-223629 | 8/1996 |
| JP | 9-247732 | 9/1997 |
| JP | 9-261725 | 10/1997 |
| JP | 10-28282 | 1/1998 |
| JP | 10-79985 | 3/1998 |
| JP | 10-510688 | 10/1998 |
| JP | 2991185 | 10/1999 |
| JP | 2002-199431 | 7/2002 |
| WO | 93/19537 | 9/1993 |
| WO | 95/04420 | 2/1995 |
| WO | 95/32594 | 11/1995 |
| WO | 96/08119 | 3/1996 |
| WO | 96/18277 | 6/1996 |
| WO | 96/19088 | 6/1996 |
| WO | 97/08911 | 3/1997 |
| WO | 97/41652 | 11/1997 |
| WO | 98/15152 | 4/1998 |

* cited by examiner

| CASE\RANK | POWER CONTROL BITS ARRANGED IN A PCM | | | DECISION FOR BTS1 |
|---|---|---|---|---|
| | ① BTS3 | ② BTS1 | ③ BTS2 | |
| 1 | 0 | 0 | 1 | DO NOT TRANSMIT TO BSC |
| 2 | 0 | 1 | 0 | TRANSMIT TO BSC |
| 3a | 1 | 1 | 0 | DO NOT TRANSMIT TO BSC |
| 3b | 0 | 1 | 1 | TRANSMIT TO BSC |
| 4 | 0 | 0 | 0 | TRANSMIT TO BSC |

| BTS | AIR-INTERFACE RANK (RM1) | BACKHAUL RANK (RM2) | POWER CONTROL BITS | DECISION |
|---|---|---|---|---|
| BTS1 | 1 | 4 | 0 | DO NOT TRANSMIT TO BSC |
| BTS2 | 3 | 2 | 1 | TRANSMIT TO BSC |
| BTS3 | 2 | 3 | 1 | DO NOT TRANSMIT TO BSC |
| BTS4 | 4 | 1 | 0 | DO NOT TRANSMIT TO BSC |

SOFT HAND-OFF IN CELLULAR MOBILE COMMUNICATIONS NETWORKS

This application is a divisional of Ser. No. 09/696,574, filed Oct. 25, 2000, now U.S. Pat. No. 6,603,971, which is a continuation of PCT application Ser. No. PCT/GB99/01347, filed on Apr. 28, 1999.

BACKGROUND OF THE INVENTION

1. Field of the Invention

The present invention relates to cellular mobile communication networks, for example Code Division Multiple Access (CDMA) cellular networks.

2. Description of the Prior Art

FIG. 1 of the accompanying drawings shows parts of a cellular mobile telecommunication network according to the Telecommunication Industries Association (TIA)/Electronic Industries Association (EIA) Standard TIA/EIA/IS-95 of October 1994 (hereinafter "IS95"). Each of three base transceiver stations (BTSs) 4 (BTS1, BTS2 and BTS3) is connected via a fixed network 5 to a base station controller (BSC) 6, which is in turn connected to a mobile switching center (MSC) 7. The BSC 6 serves to manage the radio resources of its connected BTSs 4, for example by performing hand-off and allocating radio channels. The MSC 7 serves to provide switching functions and coordinates location registration and call delivery.

Each BTS 4 serves a cell 8. When a mobile station (MS) 10 is in a so-called "soft hand-off" (SHO) region 9 where two or more cells overlap, a mobile station can receive transmission signals (downlink signals) of comparable strength and quality from the respective BTSs of the overlapping cells. Transmission signals (uplink signals) produced by the mobile station (MS) can also be received at comparable strengths and qualities by these different BTSs when the mobile station is in the SHO region 9.

FIG. 2 of the accompanying drawings shows a situation where the MS 10 is located within the SHO region 9, and is transmitting such uplink signals that are being received by plural BTSs 4. According to the IS95 standard, a BTS 4 that receives such an uplink signal from the MS 10 relays the signal to the BSC 6 via a dedicated connection line of the fixed network 5. At the BSC 6, one of the relayed signals is selected based on a comparison of the quality of each of the received signals, and the selected signal is relayed to the MSC 7. This selection is referred to as Selection Diversity.

Similarly, FIG. 3 of the accompanying drawings shows a situation where the MS 10 is located within the SHO region 9 and is receiving downlink signals from plural BTSs 4. According to the IS95 standard, downlink signals received by the BSC 6 from the MSC 7 are relayed to all BTSs 4 involved in the soft hand-off via respective connection lines of the fixed network 5, and subsequently transmitted by all the BTSs 4 to the MS 10. At the MS 10 the multiple signals may be combined, for example, by using maximum ratio combination (MRC), or one of them may be selected based on the signal strength or quality, i.e. using Selection Diversity as for the uplink case.

In contrast to, for example, Global System for Mobile Communication (GSM) networks, in CDMA networks each BTS 4 transmits at the same frequency. Consequently, careful control of transmission power must be maintained to minimize interference problems.

Signals are transmitted as a succession of frames according to the IS95 standard. As FIG. 4 of the accompanying drawings shows, each frame is of duration 20 ms, and comprises sixteen 1.25 ms time slots. In each time slot several bits of user data and/or control information can be transmitted.

Power control of transmissions from the MS 10 to the BTSs 4 (uplink power control) in IS95 is achieved as follows. When a BTS 4 receives a signal from the MS 10 it determines whether a predetermined property of the received signal (for example absolute signal level, signal to noise ratio (SNR), signal-to-interference ratio (SIR), bit error rate (BER) or frame error rate (FER)) exceeds a preselected threshold level. Based on this determination, the BTS 4 instructs the MS 10 either to reduce or to increase its transmission power in the next time slot.

For this purpose, two bits in every time slot of a pilot channel (PCH) from the BTS 4 to the MS 10 are allocated for uplink power control (see FIG. 4). Both bits have the same value, and accordingly will be referred to hereinafter as the "power control bit" (or PCB) in the singular. The power control bit is assigned a value of zero by the BTS 4 if the MS 10 is required to increase transmission power by 1 dB, and a value of one if the MS 10 is required to decrease transmission power by 1 dB. The BTS 4 is not able to request directly that the MS 10 maintain the same transmission power; only by alternately transmitting ones and zeros in the power control bit is the transmission power maintained at the same level.

When the MS 10 is in a SHO region 9, the MS 10 is required to make a decision on whether to increase or to decrease uplink transmission power based on a plurality of power control bits received respectively from the BTSs 4 involved in the soft hand-off. Consequently, an OR function is performed on all the power control bits. If the result of this OR function is zero then the MS 10 will increase power on uplink transmissions, and if the result is one then the MS 10 will decrease power on uplink transmissions. In this way, uplink transmission power is only increased if all BTSs 4 ask for an increase.

Power control of transmissions from the BTS 4 to the MS 10 (downlink power control) in IS95 is achieved as follows. When the MS 10 receives a downlink signal from a BTS 4 (or from each of a plurality of BTSs 4 in soft hand-off operation) via a traffic channel (TCH), the FER of that signal is calculated by the MS 10 this reflects the degree to which the traffic-channel signal has been corrupted by, for example, noise. This FER is then relayed by the MS 10 to the BTS 4 which transmitted the downlink signal concerned, and the BTS 4 uses this FER to decide whether to make any change to its downlink transmission power.

The soft hand-off system described above is effective in improving signal transmission between the MS 10 and the network when the MS 10 is located in regions of cell overlap near the boundaries of the individual cells. Signal quality in these regions when using a single BTS 4 may be relatively poor, but by making use of more than one BTS 4 the quality may be substantially improved.

However, the IS95 soft hand-off system has the disadvantage of increasing signal traffic ("backhaul") in the fixed network 5 since it is necessary to transmit signals carrying the same data and/or control information between the BSC 6 and every BTS 4 involved in the soft hand-off for both the uplink and downlink cases described above. This duplication of information is undesirable for two main reasons. Firstly, it leads to more traffic congestion in the fixed network. Secondly, higher costs are experienced by the mobile service provider (and consequently the mobile service user), who may not own the fixed network infrastructure.

Therefore it is desirable to provide an improved soft hand-off method capable of affording the usual benefits of soft hand-off while at the same time reducing the load on the fixed network.

SUMMARY OF THE INVENTION

According to a first aspect of the present invention there is provided a cellular mobile communications network including: a mobile station; a plurality of base transceiver stations (base stations), each for receiving uplink signals from the mobile station; and a base station controller connected to the base transceiver stations for receiving there from such uplink signals; wherein the mobile station is operable, during a soft hand-off operation involving more than one of the base transceiver stations of the network, to include, in one or more such uplink signals transmitted thereby, respective signal measures for all of the base transceiver stations involved in the operation, each signal measure serving to indicate the performance of a communications channel between the mobile station and the base transceiver station concerned; and at least one of the base transceiver stations includes a processing unit operable, when that station is involved in such a soft hand-off operation, to determine, based on an assessment of the signal measure(s) for one or more of the other base transceiver stations involved in the soft hand-off operation, not to forward to the said base station controller means such an uplink signal received from the mobile station.

According to a second aspect of the present invention there is provided a mobile station, for use in a cellular mobile communications network, including: a transmitter for transmitting uplink signals to a base transceiver station of the network; and a selection processor connected to the transmitter means and operable, during a soft hand-off operation involving a plurality of such base transceiver stations of the network, to cause the transmitter to include, in one or more of the uplink signals, respective signal measures for all the base transceiver stations involved in the operation, each such signal measure serving to indicate the performance of a communications channel between the mobile station and the base transceiver station concerned.

According to a third aspect of the present invention there is provided a base transceiver station, for use in a cellular mobile communications network, including: a receiver for receiving uplink signals from a mobile station of the network, one or more of which uplink signals includes, when the mobile station is engaged in a soft hand-off operation involving the base transceiver station and at least one further base transceiver station of the network, respective signal measures for-all the base transceiver stations involved in the operation, each signal measure serving to indicate the performance of a communications channel between the mobile station and the base transceiver station concerned; and a soft hand-off controller operable, when the claimed base transceiver station is involved in such a soft hand-off operation, to determine, based on an assessment of the signal measure(s) for one or more of the other base transceiver stations involved in the operation, not to forward to the base station controller of the network such an uplink signal received from the mobile station.

According to a fourth aspect of the present invention there is provided a soft hand-off control method for use in a cellular mobile communications network, wherein: when a soft hand-off operation involving more than one base transceiver station of the network is being performed, a mobile station of the network includes, in one or more uplink signals transmitted thereby, respective signal measures for all the base transceiver stations involved in the operation, each signal measure serving to indicate the performance of a communications channel between the mobile station and the base transceiver station concerned; and in at least one of the involved base transceiver stations, the signal measure(s) of one or more of the other base transceiver stations involved in the operation is/are assessed and a determination is made, based on the assessment, whether or not to forward to a base station controller of the network an uplink signal received from the mobile station.

According to a fifth aspect of the present invention there is provided a cellular mobile communications network including: a mobile station; a plurality of base transceiver stations, each for transmitting downlink signals to the mobile station and for receiving uplink signals from the mobile station; and a base station controller connected to the base transceiver stations for applying thereto such downlink signals; wherein the mobile station is operable, during a soft hand-off operation involving more than one of the base transceiver stations of the network, to produce respective signal measures for all the base transceiver stations involved in the operation, each signal measure serving to indicate the performance of a communications channel between the mobile station and the base transceiver station concerned; and the network including a base transceiver station selector, operable to employ the produced signal measures to determine which of the base transceiver stations involved in the operation should be used to transmit a subsequent one of the said downlink signals to the mobile station, and to cause that subsequent downlink signal to be transmitted by the base station controller only to the determined base transceiver station(s).

According to a sixth aspect of the present invention there is provided a mobile station, for use in a cellular mobile communications network, including: a transmitter for transmitting uplink signals to a base transceiver station of the network; and a selection processing unit connected to the transmitter and operable, during a soft hand-off operation involving a plurality of such base transceiver stations of the network, to produce respective signal measures for all the base transceiver stations involved in the operation, each such signal measure serving to indicate the performance of a communications channel between the mobile station and the base transceiver station concerned, and also operable to employ the produced signal measures to determine which of the involved base transceiver stations should be used to transmit a subsequent downlink signal to the mobile station, and to cause the transmitter to include, in such an uplink signal transmitted thereby, a base transceiver station selection message identifying the determined base transceiver station(s).

According to a seventh aspect of the present invention there is provided a base station controller, for use in a cellular mobile communications network to apply downlink signals to a plurality of base transceiver stations of the network, including: a receiver for receiving uplink signals from one or more of the base transceiver stations, at least one of which uplink signals includes, when a mobile station is engaged in a soft hand-off operation involving more than one of the base transceiver stations of the network, a base transceiver station selection message identifying which of the involved base transceiver stations should be used to transmit a subsequent one of the downlink signals to the mobile station; and a soft hand-off controller operable to receive the uplink signal including the base transceiver station selection message and to transmit the subsequent downlink signal only to the determined base transceiver station(s) identified in the message.

According to an eighth aspect of the present invention there is provided a soft hand-off control method for use in a cellular mobile communications network, wherein: when a soft hand-off operation involving more than one base transceiver station of the network is being performed, a mobile station produces respective signal measures for all the base transceiver stations involved in the operation, each such signal measure serving to indicate the performance of a communications channel between the mobile station and the base transceiver station concerned; and the produced signal measures are employed to determine which of the involved base transceiver stations should be used to transmit a subsequent downlink signal to the mobile station, and the subsequent downlink signal is transmitted by a base station controller of the network only to the determined base transceiver station(s).

The signal measures can be any suitable measure of the communications-channel performance between the mobile station and the base transceiver stations, for example signal strength measures (received signal strength in terms of power or amplitude or quality measures (frame error rate, signal-to-interference ratio, etc), or a combination of both strength and quality.

In preferred embodiments of the first to fourth aspects of the present invention the signal measures are respective power control bits received by the mobile station from the base transceiver stations involved in the soft hand-off operation. These power control bits indicate whether or not the mobile station is to increase or decrease its uplink transmission power to the base transceiver station and therefore serve conveniently as measures of the uplink channel performance channel between the mobile station and each base transceiver station.

In a further embodiment a cellular mobile communications network where a mobile station is capable of receiving a downlink signal from each of a plurality of base stations and transmitting an uplink signal to the plurality of base stations through a wireless channel, the network comprising: a selector unit for producing a measure of signal quality of the downlink signals from the plurality of base stations to the mobile station and for selecting a base station from which the downlink signal shows a preferred signal quality; a transmitter for transmitting the uplink signal indicating the selected base station among the plurality of base stations for subsequent communication with the mobile station; and a processing unit for processing the uplink signal to identify the selected base station, from among the plurality of base stations.

In this embodiment of the cellular mobile communications network, the mobile station may include the selector and transmitter. The transmitter may be operable to include an identification of the selected base station in the uplink signal. Further each base station includes the processing unit. The signal quality of the downlink signals from the plurality of base stations to the mobile station is represented by signal strengths of the received downlink signals.

DETAILED DESCRIPTION OF THE PREFERRED EMBODIMENTS

Figure 5:
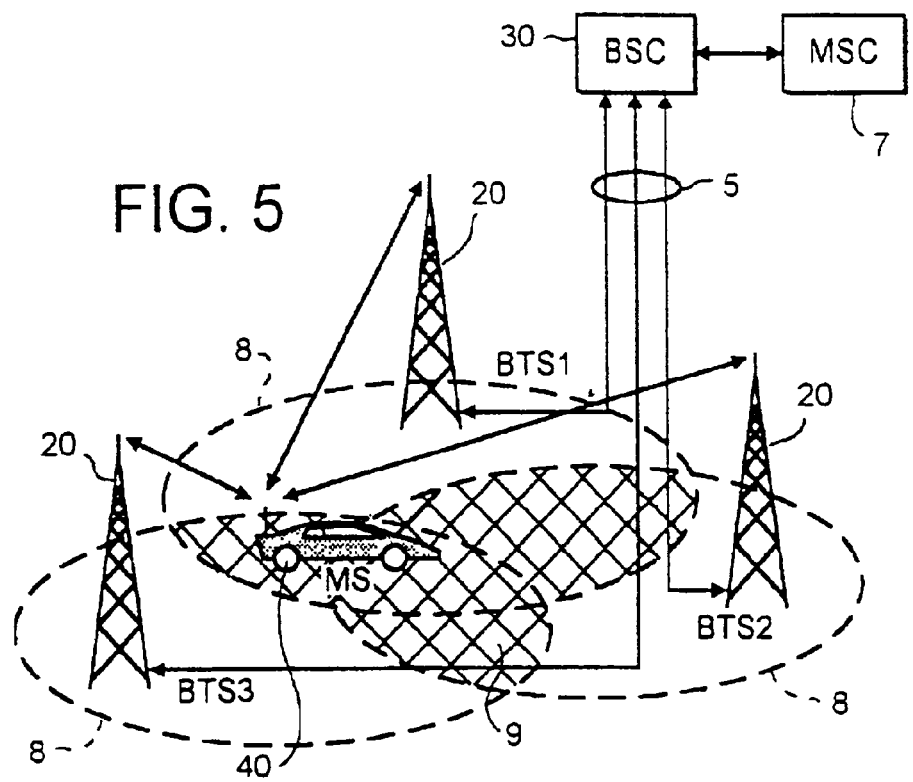
FIG. 5 shows parts of a mobile telecommunication network embodying the present invention.

FIG. 5 shows parts of a mobile telecommunication network embodying the present invention. In FIG. 5, elements that are the same as elements of the FIG. 1 network described previously have the same reference numerals and an explanation thereof is omitted.

The FIG. 5 network is a wideband CDMA (W-CDMA) network for a proposed new standard for mobile telecommunications, referred to as a universal mobile telecommunications system (UMTS) or UMTS terrestrial radio access (UTRA). This is generally similar to the IS95-standard network described previously, although certain implementation details are yet to be finalized. Details that are different from IS95 include the frame duration, which is 10 ms, and the time-slot duration which is 625 $\mu$s. The overall bit rate is within the range from 8 kbits/s to 2 Mbits/s. Also downlink power control in W-CDMA is closed-loop and is based on the same principles as the uplink power control.

In FIG. 5, each of three base transceiver stations (BTSs) 20 (BTS1, BTS2 and BTS3) is connected via a fixed network 5 to a base station controller (BSC) 30, which is in turn connected to a mobile switching center (MSC) 7. Each BTS 20 serves a cell 8. A mobile station (MS) 40 is in a soft hand-off (SHO) region 9 and can receive downlink signals from, and transmit uplink signals to, all the BTSs 20 involved in the soft hand-off.

Figure 1:
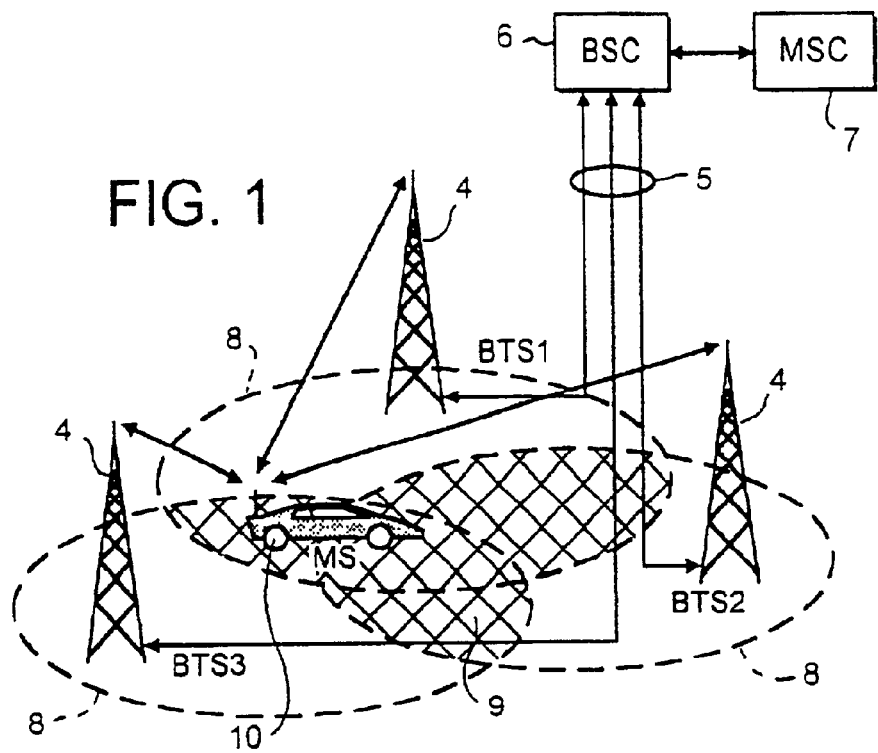
FIG. 1, discussed hereinbefore, shows parts of a cellular mobile telecommunication network according to IS95.

The FIG. 5 network corresponds generally with the FIG. 1 network, but the MS 40, BTSs 20 and BSC 30 are constructed and operate differently from the corresponding elements in FIG. 1.

Figure 6:
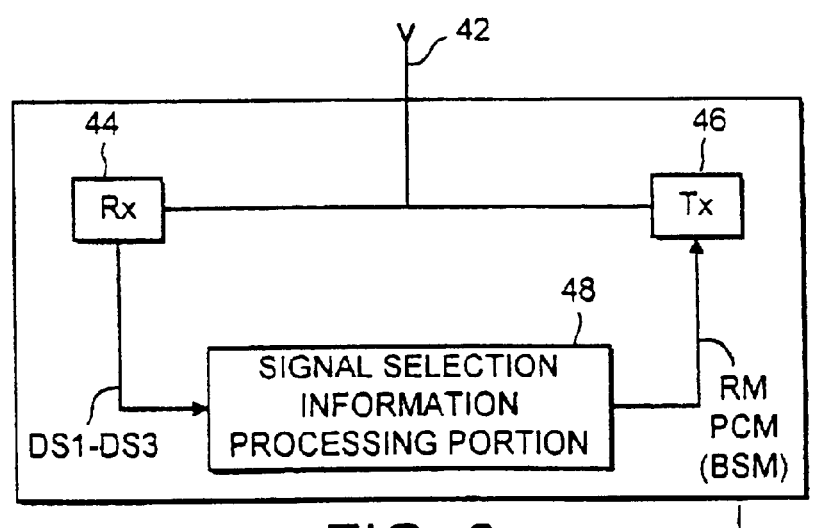
FIG. 6 shows parts of a mobile station embodying to the present invention.

FIG. 6 is a block diagram showing parts of a MS 40 embodying the present invention. An antenna element 42 is connected (e.g. via a duplexer—not shown) to a receiver portion 44 and a transmitter portion 46. A signal selection information processing portion 48 receives from the receiver portion 44 respective downlink signals DS1 to DS3 produced by the three BTSs BTS1 to BTS3 involved in the soft hand-off operation. The signal selection information processing portion 48 applies a ranking message RM and a power control message PCM to the transmitter portion 46.

Figure 7:
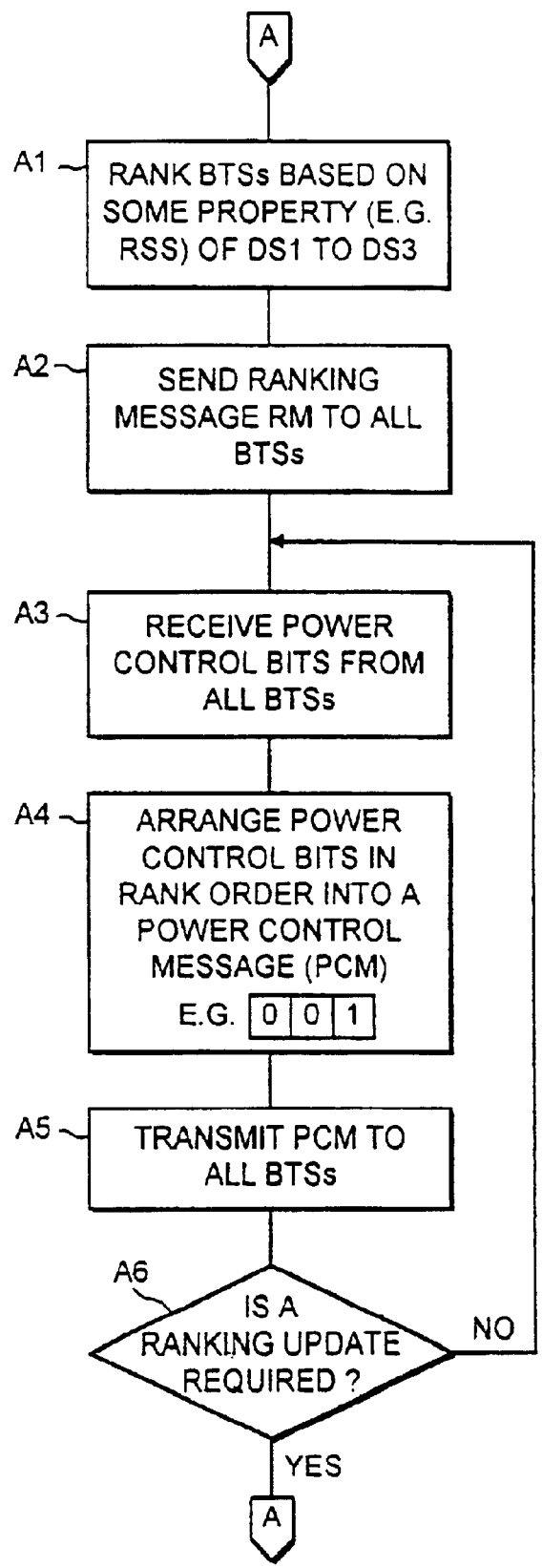
FIG. 7 is a flowchart for illustrating uplink processing operations in the FIG. 6 mobile station.

FIG. 7 is a flow chart showing the actions performed by the signal selection processing portion 48 of the MS 40 when performing uplink processing while the MS is in the soft hand-off region 9. Firstly, in step A1, the three BTSs 20 are ranked based on a predetermined property of the respective downlink signals DS1 to DS3 that are being received by the MS 40, for example received signal strength (RSS). Alternatively, the ranking may be based on a "first-come first-served" basis, i.e. on the order in which BTSs 20 became involved in the soft hand-off operation. Alternatively, the ranking could be random. In step A2 a ranking message RM, indicating the order in which the BTSs are presently ranked, is then sent via a control channel to all BTSs 20. After the ranking message is sent, processing continues to step A3.

The loop from steps A3 to A6 occurs once for every time slot of the traffic channel (TCH) and its associated control channel (DCCH) in the downlink direction. As was the case for the IS95 uplink power control method described above, every time slot of the TCH/DCCH from BTS 20 to MS 40 contains a power control bit for the purpose of instructing the MS 40 to increase or reduce its uplink transmission power. In step A3, such a power control bit is received from each of the three BTSs 40 involved in the soft hand-off.

In step A4, the plurality of power control bits received in step A3 are arranged into a power control message (PCM) in rank order according to the current BTS ranking decided in step A1. Following this, in step A5, the PCM is transmitted to all involved BTSs via a control channel.

The ranking decided in step A1 may periodically require updating, for several reasons. Firstly, as the MS 40 moves, a downlink signal may be received from a new BTS or an existing BTS may no longer be able to provide a detectable downlink signal. Secondly, the qualities of the signals received from the BTSs 20 may have changed, e.g. due to fading. Therefore, in step A6 it is decided whether or not a ranking update is required. Such an update may be carried out periodically at regular time intervals (for example every several hundred milliseconds as in GSM networks), or every frame or even every time slot. Alternatively, the ranking could be updated only when a new BTS is detected or contact with an existing one lost. If an update is required, processing is returned to step A1, otherwise processing returns to step A3 for the start of the next time slot.

Figures 8, 10:
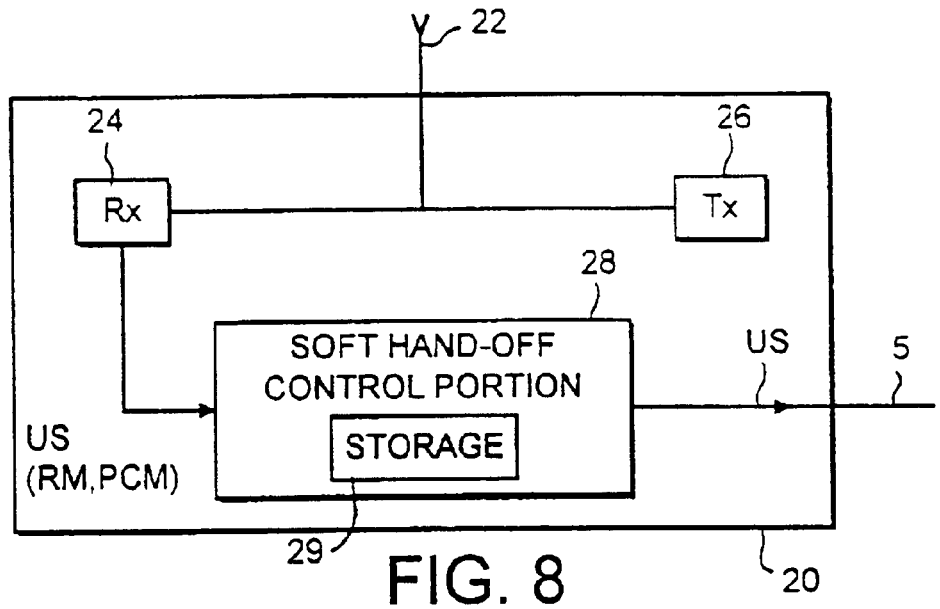
FIG. 8 shows parts of a base transceiver station (base station) embodying the present invention.
FIG. 10 shows an example decision table employed in the uplink processing by the FIG. 8 base transceiver station.

FIG. 8 is a block diagram showing parts of a BTS 20 embodying the present invention. This BTS 20 is specially adapted to receive and process the ranking message RM sent by the MS 40 in step A2 of FIG. 7 and the power control message PCM sent by the MS 40 in step A5.

An antenna element 22 is connected (e.g. via a duplexer—not shown) to a receiver portion 24 and a transmitter portion 26. A soft hand-off control portion 28 receives an uplink signal US from the receiver portion 24, and in turn applies the received US (or a signal derived therefrom) to the fixed network 5 for transmission to the BSC 30. Optionally contained within the soft hand-off control portion 28 is a storage portion 29.

In use of the BTS 20, the uplink signals sent by the MS 40 when it is in the soft hand-off region 9 include, from time to time, a ranking message RM. The uplink signals US detected by the receiver portion 24 in the BTS 20 are applied to the soft hand-off control portion 28. When the soft hand-off control portion 28 detects that a ranking message RM is included in one of the uplink signals US received thereby, it processes the ranking message concerned to determine the rank of its BTS within the ranking order determined by the MS in step A1 described above.

In each time slot, the uplink signals US produced by the receiver portion 24 also include a power control message PCM determined by the MS 40 as described above in step A4 of FIG. 7.

Operation of the soft hand-off control portion 28 in response to the presence of such a PCM in the uplink signal US produced by the receiver portion 24 will now be described with reference to FIG. 9.

Figure 9:
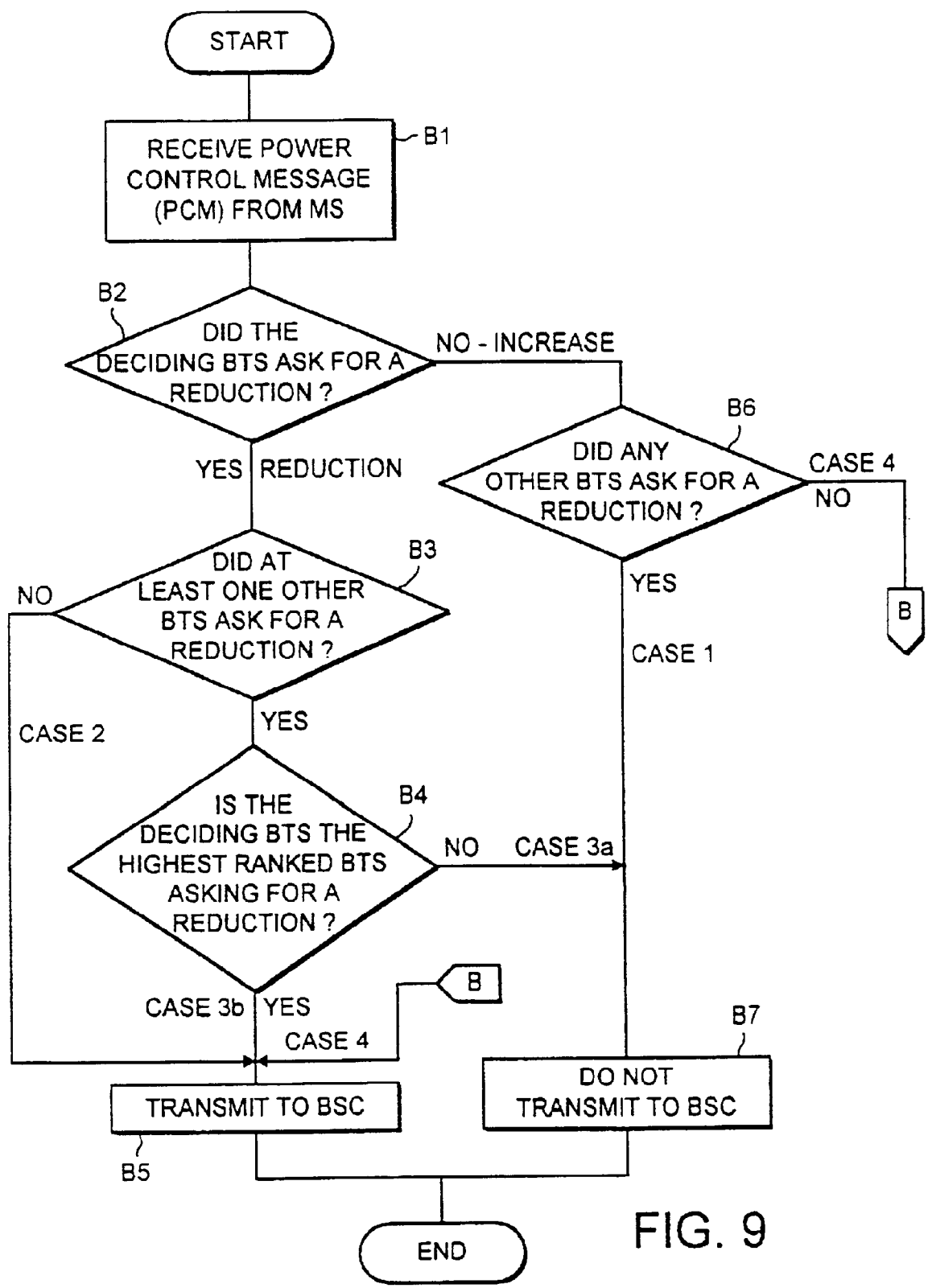
FIG. 9 is a flowchart for illustrating uplink processing in the FIG. 8 base transceiver station.

It is assumed that, by the time the sequence shown in FIG. 9 is commenced, a ranking message RM has already been received and processed (as indicated above) by the soft hand-off control portion 28.

In FIG. 9, in step B1 the PCM is received by the soft hand-off control portion and examined.

In step B2, the soft hand-off control portion 28 determines whether its BTS 20 specified, in its last power control bit (PCB) sent to the subject MS 40, that the MS 40 should reduce its uplink transmission power (PCB=1). If so, processing proceeds to step B3.

In step B3, the soft hand-off control portion 28 goes on to examine the PCM which includes the respective last PCBs of all of the other BTSs involved in the present soft hand-off operation. If any of those PCBs is 1, this denotes that at least one other BTS requested the subject MS 40 to reduce its uplink transmission power. In this case, processing proceeds to step B4.

In step B4, the soft hand-off control portion 28 determines whether or not, in the order of ranking presently determined by the MS 40, its BTS is ranked higher than each other BTS that requested the MS to reduce its uplink transmission power.

If its BTS is the highest-ranked BTS that has requested a power reduction, processing proceeds to step B5 in which the soft hand-off control portion 28 determines that its BTS is required to send the uplink signal US received in the current time slot to the BSC 30 via the fixed network 5.

If in step B4 the soft hand-off control portion 28 determined that another BTS, having a higher rank than its BTS, also asked for a power reduction, processing proceeds to step B7 in which the soft hand-off control portion 28 determines that it is not required to transmit the uplink signal US received from the mobile station 40 in the current time slot to the BSC 30.

In step B3, if the soft hand-off control portion 28 determines that its BTS was the only BTS involved in the soft hand-off operation to ask for a power reduction, processing proceeds to step B5 in which the uplink signal US for the current time slot is transmitted by the BTS to the BSC 30.

If in step B2 the soft hand-off control portion 28 determines that it asked the MS 40 for a power increase (i.e. its last PCB was 0), processing proceeds to step B6. In step B6 the soft hand-off control portion 28 determines, by referring to the PCM, whether any other BTS asked for a reduction (i.e. the last PCB specified by that other BTS was 1). If so, the soft hand-off control portion 28 determines that its BTS is not required to transmit the uplink signal US to the BSC 30 in the current time slot and processing proceeds to B7. If, on the other hand, no other BTS requested a power reduction (i.e. all BTSs involved in the present soft hand-off operation requested an increase in the MS uplink transmission power), processing proceeds to step B5 and the US for the current time slot is transmitted by the BTS to the BSC 30.

After step B5 or B7 (as the case may be) processing for the current time slot is completed and the soft hand-off control portion 28 awaits the next PCM or RM from the MS 40.

As described above with reference to FIG. 9, by virtue of its receipt of the PCM, the soft hand-off control portion 28 in each BTS involved in a soft hand-off operation has knowledge of the last power control bit sent to the subject MS 40 by all of the other BTSs, as well as by its own BTS. By comparing these PCBS, the soft hand-off control portion in each BTS can decide whether or not to transfer the uplink signal US received in the current time slot to the BSC, such that, whenever possible, only one of the BTSs involved in the soft hand-off transfers the uplink signal US to the BSC.

Based on the received PCBs, the soft hand-off control portion 28 in each "deciding BTS" identifies whether the power reduction/increase requests by the different BTSs fall into one of four different cases.

Case 1:

If the deciding BTS has asked for a power increase while at least one other BTS has asked for a power reduction, it suggests that at least one other BTS is enjoying a better-quality uplink signal from the MS 40. Accordingly, this other BTS, rather than the deciding BTS, should send the uplink signal US in the current time slot to the BSC. The deciding BTS therefore decides not to send the uplink signal US.

Case 2:

If the deciding BTS has requested a power reduction but every other BTS involved in the soft hand-off operation has requested an increase in power, the deciding BTS determines that it is receiving the best-quality signal from the MS and decides to transmit the US in the current time slot to the BSC.

Case 3:

If the deciding BTS has asked the MS to reduce power, and at least one other BTS has also asked for such a power reduction, the decision as to which BTS is to transfer the US is based on rank. For example, the highest-ranked of the BTSs requesting a power reduction determines that it should transfer the US in the current time slot to the BSC. Thus, case 3 is divided into two sub-cases 3a and 3b. In case 3a the deciding BTS determines that a higher-ranked BTS has asked for a power reduction and so determines that it should not send the US. In case 3b, on the other hand, the deciding BTS determines that it is the highest-ranked of the BTSs requesting a power reduction, and transfers the US to the BSC 30.

Figure 2:
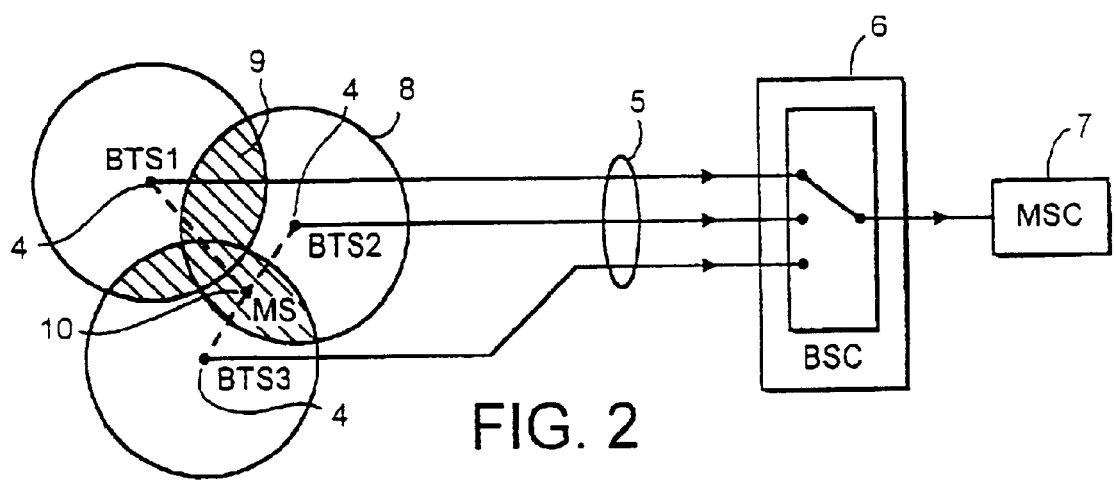
FIG. 2, also discussed hereinbefore, shows a schematic view for use in explaining processing of uplink signals in a soft hand-off operation performed by the FIG. 1 network.
Figure 3:
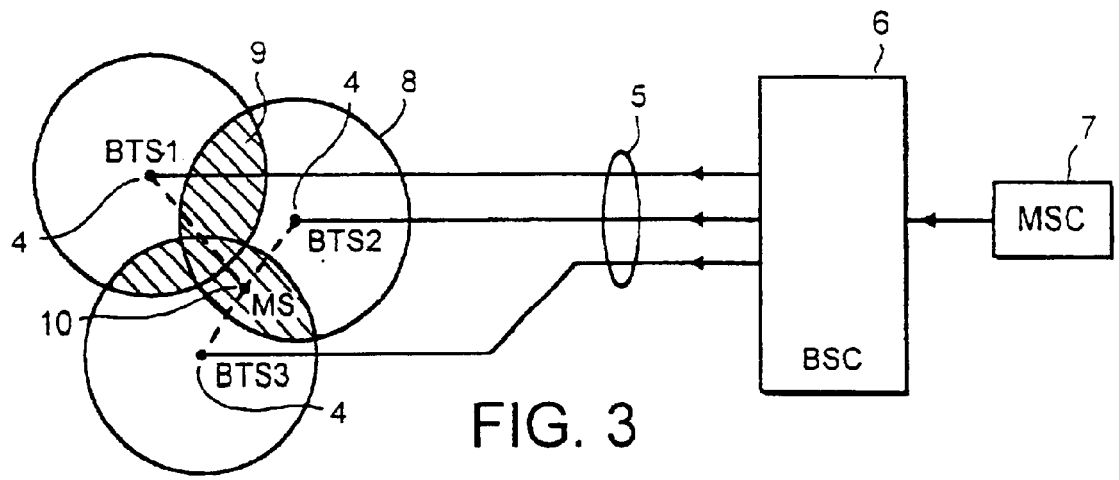
FIG. 3, also discussed hereinbefore, shows a schematic view for use in explaining processing of downlink signals in such a soft hand-off operation.
Figure 4:
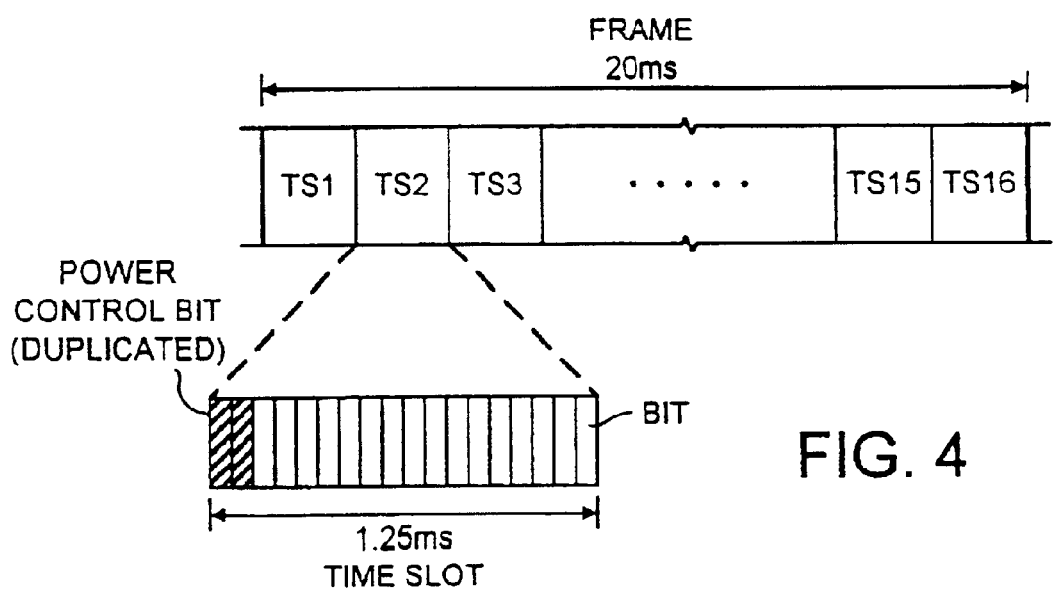
FIG. 4, also discussed hereinbefore, illustrates the format of a time frame in the FIG. 1 network.

Case 4:

If all the BTSs involved in the soft hand-off operation have requested the MS to increase its transmission power, all of the BTSs transfer their respective uplink signals US in the current time slot to the BSC, as in the conventional soft hand-off operation described previously with reference to FIG. 2. This permits maximum ratio combining (MRC) processing of the different uplink signals at the BSC 30.

As described above, the ability to make decisions at the BTS, rather than at the BSC, facilitates a significant reduction in the fixed-network backhaul for uplink processing in the soft hand-off operation.

FIG. 10 shows an example decision table for use in illustrating operation of the soft hand-off control portion 28 during uplink processing. In this example, it is assumed that the BTSs involved in the soft hand-off operation are ranked as follows: BTS3 has rank ①(the highest rank); BTS1 has rank ②; and BTS2 has rank ③ (the lowest rank).

As illustrated in FIG. 10, the MS 40 arranges the power control bits PCBs for the different BTSs in the power control message PCM in the order of rank of the BTSs. Thus, the first bit in the PCM corresponds to the rank-① BTS (BTS3 in this example); the second bit in the PCM corresponds to the rank-② BTS (BTS1); and the third bit in the PCM corresponds to the rank-③ BTS (BTS2).

In this example, it is also assumed that the deciding BTS is BTS1 (which in this case is the middle-rank BTS).

In case 1 above, the PCM=001, indicating that BTS2 alone has requested a power reduction. Thus, BTS2 should transmit the uplink signal for the current time slot and BTS1 determines that it should not transmit the uplink signal.

In case 2, the PCM=010, indicating that the deciding BTS1 alone has requested a power reduction. Accordingly, BTS1 determines that it should transmit the uplink signal US to the BSC.

In case 3a, both BTS3 and BTS1 have requested a power reduction, whereas BTS2 has requested a power increase. In this case, the deciding BTS1 refers to its rank in the order of ranking determined by the MS and establishes that, as the first PCM bit (corresponding to the higher-rank BTS3) is 1, it (the deciding BTS1) should not transmit the US to the BSC.

In case 3b, on the other hand, the PCM=011, indicating that both BTS1 and BTS2 have requested a power reduction and BTS3 has requested a power increase. In this situation, the deciding BTS1 determines that no BTS of rank higher than it has requested a power reduction (the first PCM bit is 0) and therefore decides to transmit the US to the BSC.

Finally, in case 4, the PCM=000 which indicates that all BTSs have requested a power increase. In this case, the deciding BTS1 determines that it should transmit the US to the BSC.

It will be appreciated that it is not essential for the decision-making carried out by the BTSs involved in the soft hand-off operation to result in only one of the BTSs transmitting the US to the BSC in the current time slot in the cases 1, 2, 3a and 3b. For example, some benefit would still be achieved, in terms of reducing the fixed-network backhaul for uplink processing, as long as at least one BTS decides not to transmit the US in any of the cases 1, 2, 3a or 3b.

It will also be appreciated that, in order to avoid erroneous decision making in the BTSs, based for example on temporary phenomena in the uplink signal reception at the BTSs, it may be preferable for the BTSs to make their uplink-signal transmission decisions based on a history of the power control-bits sent to the MS. For example, the storage portion 29 included within each soft hand-off control portion 28 could be used to store one or more previous PCMs received by the BTS. Using this PCM history, as stored in the storage portion 29, each BTS could make a more informed decision as to whether or not to transmit the uplink signal to the BSC.

For example, if the history of the PCMs shows that each BTS is sending alternate ones and zeros to the MS (indicating generally that the signal conditions between the MS and each BTS involved in the soft hand-off operations are effectively static), it would be unproductive for the transmitting BTS to continuously "swap around" as a result of the alternating ones and zeros. Such swapping around could be eliminated, for example, by providing each soft hand-off control portion 28 with a facility to identify a "don't care" reception situation (such as a stream of alternating ones and zeros) for each BTS involved in the soft hand-off operation. In this "don't care" situation, the soft hand-off control portion 28 could simply decide to apply the last decision it made as to whether or not to transmit the uplink signal to the BSC this time around, so eliminating the swapping around phenomenon. Other "don't care" situations could also be identified, for example by applying a moving average to the sequence of PCBs received for any given BTS.

Similarly, a moving average could be used to make the decision as to whether the reception conditions fall into any of cases 1 to 4 in FIG. 10. In this case, instead of "1" or "0" in FIG. 10 representing just the PCB in the current PCM, "1" or "0" could represent the moving average (rounded up or down to 1 or 0) for the BTS concerned over the past (say) 4 PCMs.

It will also be understood that it is not necessary for the uplink processing to take place every time slot. It would also be possible for the PCM to be transmitted only once per frame, in which case the decision-making applied by each BTS would be made on a frame-by-frame basis.

Furthermore, it would even be possible for the decisions to be made at time intervals other than frames or time slots, for example based on a time interval consistent with the fading characteristics of the RF channels in the network.

In the embodiment described above, when two or more BTSs involved in the soft hand-off operation have comparably-good uplink channel performances, the BTS used to transmit the uplink signal to the BSC is selected based on the BTS ranking determined by the mobile station alone. However, it is not essential for the ranking of the BTSs to be performed exclusively by the MS and it is possible for the ranking (or part of it) to be performed elsewhere in the network (e.g. in the BSC) based on other criteria.

For example, in a preferred embodiment the BTSs may be ranked according to a first ranking determined by the mobile station as described previously. This first ranking may be termed a ranking based on the air interface between the mobile station and the BTSs. The BTSs may also be ranked according to a second ranking determined by the BSC. This second ranking may be based on so-called "backhaul preference", i.e. an order of preference in which the BTSs should transfer (backhaul) the received uplink signal to the BSC. Factors which influence the backhaul preference include: congestion and availability of the fixed-network communication paths linking the different BTSs to the BSC; the quality of those communication paths; and the cost of using those communications paths. In particular, the fixed network employed to provide the communications paths between the BTSs and the BSC is subject to congestion so that availability problems may arise. Also, some communications paths such as microwave links may offer relatively low quality compared to other types of communication path such as fiber-optic paths. Cost considerations also arise because the fixed-network operator may levy different charges for the use of the different communications paths, including different charges for different bandwidths and different tariffs at different times of use.

Accordingly, by ranking the BTSs in accordance with backhaul preference (as well as in accordance with air-interface performance), it is possible to employ a combination of the backhaul preference determined by the second ranking and the air-interface preference determined by the first ranking in suitable cases.

Figures 11, 12:
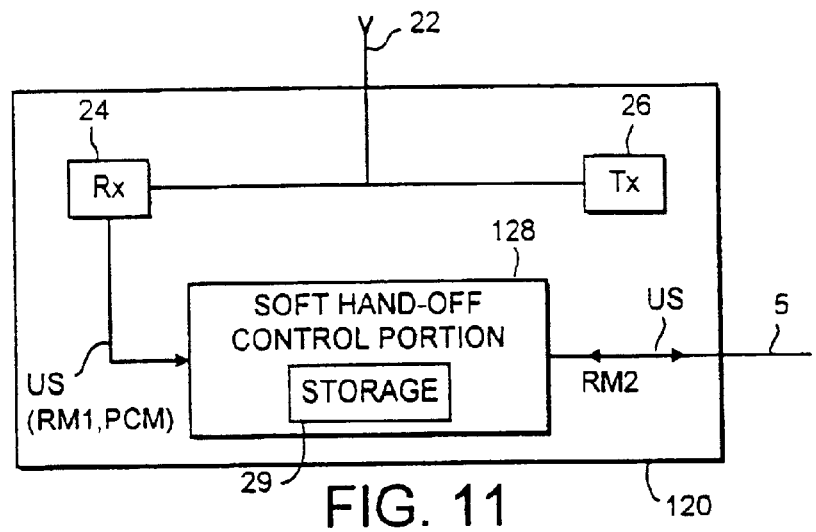
FIG. 11 shows parts of another base transceiver embodying the present invention.
FIG. 12 shows a further example decision table employed in the uplink processing by the FIG. 10 base transceiver station.

FIG. 11 shows parts of a BTS 120 for use in the above-described example. The FIG. 11 BTS 120 is constituted in basically the same way as the BTS 20 of FIG. 8, but includes a modified soft hand-off control portion 128 which receives a first ranking message RM1 from the mobile station and a second ranking message RM2 from the BSC via the fixed-network connection path 5.

To this end the BSC in this embodiment further includes a communications path ranking portion (not shown in the drawings) which determines the backhaul preference based on one or more of the factors mentioned above and transmits the second ranking message specifying the determined backhaul preference to the BTSs involved in the soft hand-off operation.

The soft hand-off control portion 128 employs a super decision-matrix when deciding whether or not its BTS 120 should forward an uplink signal US received from the mobile station to the BSC.

FIG. 12 shows one example of the application of this super decision matrix.

In this example, it is assumed that four BTSs are involved in the soft hand-off operation. In accordance with the first ranking message RM1 provided to the soft hand-off control portion 128 by the mobile station, the four BTSs are ranked as follows: BTS1—rank ①; BTS2—rank ②; BTS3—rank ③; BTS4—rank ④. According to the second ranking message RM2 provided to the soft hand-off control portion 128 by the BSC, the BTSs are ranked differently as follows: BTS1—rank ④; BTS2—rank ②; BTS3—rank ③; and BTS4—rank ①.

In this example it is also assumed that the power control bits (arranged in a power control message PCM received from the mobile station) are (in order from BTS1 to BTS4) 0,1,1,0. This signifies that BTS2 and BTS3 are both enjoying comparably-good communications-channel performances. In this case (which corresponds to cases 3a and 3b in FIG. 10) a decision, as to which of these two candidate BTSs BTS2 and BTS3 should transmit the received uplink signal in the next time slot to the BSC, is made based on a combination of the two rankings (air-interface ranking provided by the first ranking message RM1 and backhaul ranking provided by the second ranking message RM2).

In each of the BTSs concerned (BTS2 and BTS3), the soft hand-off control portion 128 determines that it should follow the backhaul ranking preference, which indicates that BTS2 rather than BTS3 should be used to transmit the uplink signal to the BSC, even though according to the air-interface ranking, BTS2 is inferior to BTS3. Such a decision is possible because, in this case, the difference in air-interface ranking between the two candidate BTSs BTS2 and BTS3 is only one, indicating that BTS2 is only slightly inferior to BTS3. (It might not be desirable to follow the backhaul ranking preference had the two candidate BTSs had been BTSs having very different air-interface rankings, for example BTS1 and BTS4).

Thus, as described above, the decision-making in the soft hand-off control portions of the different BTSs involved in the soft hand-off operation can be based on one of the two rankings (air-interface ranking and backhaul ranking) alone or on a combination of both types of ranking. In particular, it will be understood that when the ranking applied by the mobile station (air-interface ranking) is purely random or based on the order of involvement of the BTSs in the soft hand-off operation, it may well be preferable for the air-interface ranking to be overridden completely by the backhaul ranking.

FIG. 6 is a block diagram showing parts of a MS 40 embodying the present invention. An antenna element 42 is connected (e.g. via a duplexer—not shown) to a receiver portion 44 and a transmitter portion 46. A signal selection information processing portion 48 from the receiver portion 44 respective downlink signals DS1 to DS3 produced by the three BTSs BTS1 to BTS3 involved in the soft hand-off operation. The signal selection information processing portion 48 applies a ranking message RM and a power control message PCM to the transmitter portion 46.

Referring again to FIG. 6, to deal with the downlink processing, the signal selection information processing portion 48 is required to perform a further function in addition to the generation of the ranking message RM and power control message PCM as described previously. In this case, as in the previously-described ranking process the signal selection information processing portion 48 again processes the respective downlink signals DS1 to DS3 received from the BTSs (BTS1 to BTS3) involved in the soft hand-off operation, and compares these downlink signals according to a predetermined property (which may be the same property as for the uplink processing case or another property, as desired). In a preferred embodiment, the predetermined property is the received signal strength (RSS), possibly together with the signal-to-interference ratio (SIR). These performance measures are determined for the downlink DCCH.

The signal selection information processing portion 48 employs the performance measures to select which of the BTSs involved in the soft hand-off operation is to be used to transmit the downlink signal to the MS in the next time slot.

The signal selection information processing portion 48 may select the BTS that is to transmit the downlink signal in the next time slot based on, for example, the following cases.

Case 1:

If the RSS (and/or SIR) of a single BTS is higher than each other BTS, that single BTS is selected to transmit the downlink signal in the next time slot.

Case 2:

If two or more BTSs have comparably-good RSS (and/or SIR), one of them is selected based on an order of ranking (e.g. order of involvement in the soft hand-off operation or random).

Case 3:

If all the BTSs involved in the soft hand-off operation fail to meet a prescribed RSS (and/or SIR) threshold, all the BTSs are selected to transmit the downlink signal in the next time slot, so that a MRC operation can be performed at the MS 40 to give the best chance of obtaining a useful signal.

After determining which BTS(s).is/are to be used, the signal selection information processing portion 48 transmits a BTS selection message (BSM), identifying the BTS(s) to be used, to all of the BTSs on a control channel.

For example, using two bits to provide the BSM, the BSM may be set to "01" to designate BTS1; "10" to designate BTS2; and "11" to designate BTS3. "00" denotes that all the BETSs should be used to transmit the downlink signal in the next time slot.

Each BTS receives the BSM via the control channel from the MS 40. One or more of the BTSs then forward the BSM to the BSC 30. As described previously with reference to FIGS. 8 to 10, only one BTS may decide to transmit the uplink signal including the BSM to the BSC, by applying the decision-making strategy described previously for the uplink processing. However, the number of BTSs that forward the BSM to the BSC is irrelevant to this aspect of the invention, and all BTSs could forward the BSM to the BSC.

Figure 13:
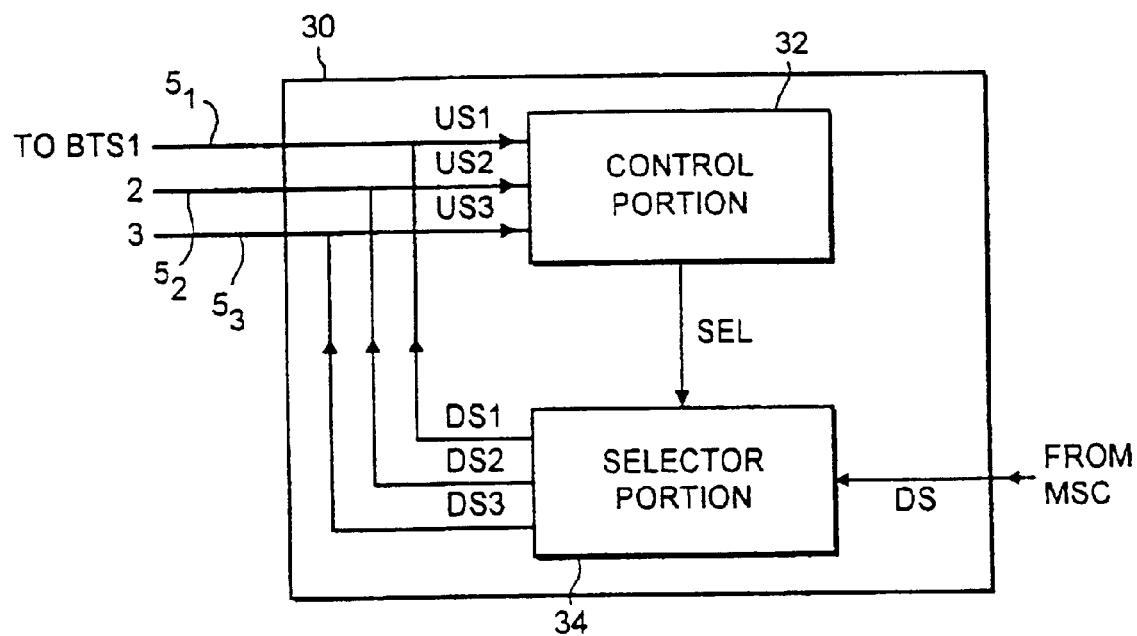
FIG. 13 shows parts of a base station controller embodying the present invention.

FIG. 13 shows part of a BSC adapted to perform downlink processing in the soft hand-off operation. The BSC 30 includes a control portion 32 and a selector portion 34.

In this example, it is assumed that the connection lines $5_1$ to $5_3$ linking each BTS to the BSC 30 are duplex lines, which carry respective uplink and downlink signals US, and DS between the BTS concerned and the BSC. For example, a first connection line $5_1$ carries respective uplink and downlink signals US1 and DS1 between the BTS1 and the BSC 30.

The selector portion 34 receives at its input a downlink signal DS supplied by the MSC (7 in FIG. 5). The selector portion 34 has three outputs connected respectively to the connection lines $5_1$ to $5_3$.

The selector portion 34 also has a control input which receives a selection signal SEL. In response to the SEL selection signal the selector portion 34 connects its input to one, or all, of its three outputs.

The control portion 32 also has three inputs connected respectively to the connection lines $5_1$ to $5_3$ for receiving the uplink signals US1 to US3 from BTS1 to BTS3 respectively. The control portion applies the selection signal SEL to the selector portion 34.

In operation of the BSC shown in FIG. 13, in each time slot of the uplink signal the control portion 32 receives one or more of the three uplink signals US1 to US3 from the BTSs involved in the soft hand-off operation. When the BSM supplied by the MS 40 is detected within a received uplink signal US1, US2 or US3, the control portion 32 examines the BSM and determines therefrom which of the BTSs is to be used to transmit the downlink signal in the next time slot to the MS 40.

If the BSM designates a single BTS, the control portion 32 sets the selection signal SEL such that the selector portion 34 supplies the downlink signal DS just to that one of the connection lines $5_1$ to $5_3$ connecting the BSC 30 to the designated BTS. If, on the other hand, all BTSs are designated by the BSM, the selection signal SEL is set so that the downlink signal DS received from the MSC 7 is supplied to all of the connection lines $5_1$ to $5_3$.

It will be appreciated that it is not necessary for the downlink processing to be performed on a time slot-by-time slot basis. It could be performed on a frame-by-frame basis or the BTS selection could be made at some other suitable time interval.

It would also be possible for the signal selection information processing portion 48 (FIG. 6) to include its own storage portion (similar to the storage portion 29 in FIG. 8) enabling it to store a past history of the RSS (and/or SIR) measures for the different BTSs currently involved in the soft hand-off operation. In this case, as described previously in relation to the uplink processing, it would be possible for the MS to employ more sophisticated decision-making in relation to the BTS selection so as to avoid undesirable effects caused by temporary reception phenomena or other problems caused by too frequent-changing of the BTS selection.

It is not necessary for the mobile station to carry out the comparison of the signal measures for the different downlink signals and make the determination of the BTS to be used to transmit the downlink signal. The comparison and BTS determination could be carried out in the BSC; in this case instead of transmitting the BSM to the BTSs involved in the soft hand-off operation, the mobile station could transmit the downlink signal measures themselves (in some suitable form). These measures would then be delivered in the usual way to the BSC, enabling it to compare them and then make the BTS determination.

Although the present invention has been described above in relation to the proposed European wideband CDMA system (UTRA) it will be appreciated that it can also be applied to a system otherwise in accordance with the IS95 standard. It would also be possible to apply the invention in other cellular networks not using CDMA, for example networks using one or more of the following: multiple-access techniques: time-division multiple access (TDMA), wavelength-division multiple access (WDMA), frequency-division multiple access (FDMA) and space-division multiple access (SDMA).

I claim:

1. Signal processing circuitry, for use in a mobile station capable of receiving a downlink signal from each of a plurality of base stations and transmitting an uplink signal to the plurality of base stations through a wireless channel, said signal processing circuitry comprising:

a processor which produces a measure of a signal quality of the downlink signals received from the plurality of base stations in a soft handoff mode with said mobile station, selects a base station from which a downlink signal shows a preferred signal quality, and controls transmission of the uplink signal to indicate the selected base station, among the plurality of base stations, for subsequent communication with the mobile station, wherein while in said soft handoff mode, said processor periodically re-selecting a base station from which the downlink signal shows the best signal quality and transmitting the uplink signal indicating the selected base station, among the plurality of base stations in said soft hand-off mode.

2. The signal processing circuitry as claimed in claim 1, wherein the signal quality of the downlink signals from the plurality of base stations is represented by signal strengths of the received downlink signals.

3. The signal processing circuitry of claim 1, wherein said selected base station transmits a subsequent downlink signal to the mobile station while said plurality of base stations continue in said soft hand-off mode with the mobile station, and a downlink power of said plurality of base stations is controlled according to whether a particular base station is a selected base station.

4. The signal processing circuitry of claim 1, wherein said mobile station receiving the next downlink signal from at least the selected base station while maintaining the soft handoff mode with the base stations in said soft hand-off mode which are not selected base stations.

5. The signal processing circuitry of claim 1, wherein said mobile station receiving a next downlink signal from one or more selected base stations in the soft hand-off mode, the signal processing circuitry providing an identification for each base station in the soft hand-off made while maintaining the soft handoff mode with the base stations.

6. Signal processing circuitry, far use in a mobile station in which said mobile station is capable of receiving a downlink signal from each of a set of base stations in a soft hand-off mode with the mobile station and transmitting an uplink signal to the set of base stations through a wireless channel, said signal processing circuitry comprising:

a selection unit producing a measure of signal quality of the downlink signals from the set of base stations in said soft hand-off mode with the mobile station and selecting a base station from which the downlink signal shows a preferred signal quality;

a transmitter transmitting the uplink signal including an identification of the selected base station among the set of base stations in a soft hand-off mode.

wherein said selection unit, while said mobile station is in said soft handoff mode, periodically re-selecting a base station from which the downlink signal shows the preferred signal quality and transmitting the uplink signal indicating the selected base station, among the plurality of base stations in said soft hand-off mode.

7. The signal processing circuitry of claim 6, wherein said mobile station receives a subsequent downlink signal from the selected base station while the non-selected base stations continue in said soft hand-off mode.

* * * * *